(12) United States Patent
Fritz et al.

(10) Patent No.: US 12,392,349 B2
(45) Date of Patent: Aug. 19, 2025

(54) ELECTRIC MOTOR WITH COOLING ARRANGEMENT

(71) Applicant: KSB SE & Co. KGaA, Frankenthal (DE)

(72) Inventors: Jochen Fritz, Frankenthal (DE); Christoph Jaeger, Frankenthal (DE); Toni Klemm, Frankenthal (DE); Matthias Mohr, Frankenthal (DE)

(73) Assignee: KSB SE & Co. KGaA, Frankenthal (DE)

( * ) Notice: Subject to any disclaimer, the term of this patent is extended or adjusted under 35 U.S.C. 154(b) by 37 days.

(21) Appl. No.: 18/285,038

(22) PCT Filed: Mar. 28, 2022

(86) PCT No.: PCT/EP2022/058086
§ 371 (c)(1),
(2) Date: Sep. 29, 2023

(87) PCT Pub. No.: WO2022/207545
PCT Pub. Date: Oct. 6, 2022

(65) Prior Publication Data
US 2024/0191718 A1 Jun. 13, 2024

(30) Foreign Application Priority Data
Apr. 1, 2021 (DE) .................... 10 2021 108 359.1

(51) Int. Cl.
*F04D 25/08* (2006.01)
*F04D 17/08* (2006.01)
(Continued)

(52) U.S. Cl.
CPC .......... *F04D 25/082* (2013.01); *F04D 17/08* (2013.01); *F04D 29/441* (2013.01);
(Continued)

(58) Field of Classification Search
CPC ......... F04D 29/082; F04D 29/26; H02K 5/18; H02K 9/06
(Continued)

(56) References Cited

U.S. PATENT DOCUMENTS 5,763,969 A * 6/1998 Metheny ................ H02K 11/33
310/58
5,780,946 A * 7/1998 Nakamura ............... H02K 9/16
310/58
(Continued)

FOREIGN PATENT DOCUMENTS

CH         158635 A     11/1932
DE   10 2008 051 650 A1   4/2010
(Continued)

OTHER PUBLICATIONS

International Search Report (PCT/ISA/210) issued in PCT Application No. PCT/EP2022/058086 dated Jul. 28, 2022 with English translation (6 pages).
(Continued)

*Primary Examiner* — Kenneth J Hansen
(74) *Attorney, Agent, or Firm* — Crowell & Moring LLP (57) ABSTRACT

An electric motor is configured to drive a centrifugal pump. The electric motor includes a cooling arrangement. The cooling arrangement includes a fan impeller and a shroud. The shroud encloses a space around the fan impeller. Guide elements are arranged in the space.

13 Claims, 5 Drawing Sheets

(51) Int. Cl.
  *F04D 29/28* (2006.01)
  *F04D 29/44* (2006.01)
  *F04D 29/58* (2006.01)
  *H02K 9/06* (2006.01)

(52) U.S. Cl.
  CPC ..... *F04D 29/5806* (2013.01); *F04D 29/5813* (2013.01); *H02K 9/06* (2013.01); *F04D 29/281* (2013.01)

(58) Field of Classification Search
  USPC .......................................................... 310/63
  See application file for complete search history.

(56) References Cited

U.S. PATENT DOCUMENTS

| | | | | |
|---|---|---|---|---|
| 2005/0186070 | A1* | 8/2005 | Zeng | F04D 29/544 415/211.2 |
| 2016/0245298 | A1* | 8/2016 | Ohtaguro | F04D 29/281 |
| 2018/0177373 | A1 | 6/2018 | Hayamitsu | |
| 2019/0186500 | A1 | 6/2019 | Hohn et al. | |
| 2021/0006128 | A1* | 1/2021 | Eason | H02K 11/33 |

FOREIGN PATENT DOCUMENTS

| | | |
|---|---|---|
| DE | 10 2011 109 535 A1 | 2/2013 |
| JP | 58-195098 A | 11/1983 |
| JP | 11-275812 A | 10/1999 |

OTHER PUBLICATIONS

German-language Written Opinion (PCT/ISA/237) issued in PCT Application No. PCT/EP2022/058086 dated Jul. 28, 2022 with English translation (9 pages).

German Search Report issued in German Application No. 10 2021 108 359.1 dated May 5, 2022 with partial English translation (15 pages).

* cited by examiner

ELECTRIC MOTOR WITH COOLING ARRANGEMENT

CROSS REFERENCE TO RELATED APPLICATIONS

This application claims priority under 35 U.S.C. § 119 from German Patent Application No. 102021108359.1, filed Apr. 1, 2021, the entire disclosure of which is herein expressly incorporated by reference.

BACKGROUND

The disclosure relates to an electric motor for driving a centrifugal pump, having a cooling arrangement which comprises a fan impeller and a shroud, the shroud enclosing a space around the fan impeller.

A centrifugal pump arrangement generally comprises one or more centrifugal pumps, one or more electric motors, and power electronics units for rotational speed control by frequency conversion. Particularly the electric motors and the associated motor electronics require adequate cooling during operation.

Typical electric motors of this kind are generally known and are predominantly mass-produced. Here, an electric motor is composed of a rotor connected rotationally conjointly to the motor shaft, of a stator with an enwound stator core, of a stator housing with cooling fins on the outside, of end shields situated on both sides and comprising rolling or plain bearings, and of a fan impeller connected rotationally conjointly to the shaft at the shaft end situated opposite the drive side, which fan impeller is enclosed by a fan shroud that is connected fixedly to the stator housing.

A box, the so-called electronics housing, in which the components of the motor electronics are installed, is commonly arranged on the stator housing. In general, the motor electronics comprise a frequency converter and a power controller and/or a rotational speed controller. Such electronics housings are often arranged on a pedestal in order that the waste heat of the electric motor does not influence the motor electronics and the cooling air flow generated by the motor fan can also be utilized for cooling the motor electronics.

The cooling air emerging radially from the fan impeller is conducted in an axial direction to the cooling fins of the stator housing by the fan shroud, and said fan shroud also prevents an ingress of foreign bodies by way of a grille arranged on the incident-flow side of the fan impeller.

DE 10 2008 051 650 A1 discloses an disclosure with joint cooling of the motor and of the motor electronics, in the case of which the air flow is drawn in through the inlet grille of the fan shroud before the fan impeller drives the air flow for the purposes of cooling the motor and the electronics housing. The focus here is on cooling a very large set of motor electronics, which is constructed both axially and radially around the motor.

SUMMARY

Mass-produced electric motors are commonly equipped with bi-directional fan impellers. The motors, including their fans, can thus be used for both clockwise and anticlockwise operation. The blades of the fan impeller are oriented purely radially in order to achieve cooling performance that is independent of a direction of rotation. This gives rise to a highly pulsed inflow and outflow of the cooling air. This pulsing condition leads to vortex formation and to flow separation of the cooling air, which reduces the effectiveness and efficiency of the cooling. Furthermore, the vortices in the cooling air generate noise which is perceived as disturbing by persons in the vicinity or which, if it is of relatively high intensity, may even be detrimental to health.

Furthermore, in the case of electric motors that are operated at low rotational speed, the cooling air flow may no longer be adequate to dissipate the waste heat of the stator and that of the motor electronics simultaneously.

Particularly the covers or fan shrouds of the fan impeller are poorly optimized with regard to the guidance of the cooling air flow. Aside from simply redirecting the cooling air flow, they serve primarily for protecting against inadvertent encroachment into the rotating parts of the fan arrangement. The design of the fan shroud therefore makes a not inconsiderable contribution to the generation of noise.

It is an object of the disclosure to design an electric motor with a cooling device such that adequate cooling performance can be achieved even with a low rotational speed. It should be possible here for the electric motor and the cooling device to be operated with the least possible generation of noise. The cooling device should furthermore ensure protection against inadvertent access. The exchange of replacement parts should be made easier by the construction of the electric motor with a cooling device. The device should be easy and inexpensive to produce.

Said object is achieved according to the disclosure by an electric motor having a cooling arrangement. Preferred variants emerge from the description and from the drawings.

According to the disclosure, on an electric motor for driving a centrifugal pump, having a cooling arrangement which comprises a fan impeller and a shroud, guide elements are arranged in the space enclosed by the shroud.

Ideally, the guide elements are of blade-like configuration and have a radial leading edge and an axial trailing edge. They are arranged so as to be static in the shroud of the fan. Their objective is to redirect, with the least possible losses, the swirling flow emerging from the fan impeller into a flow with the least possible swirl for cooling the electric motor and the motor electronics. In this way, the cooling is advantageously highly effective even at low rotational speeds of the electric motor, because the air flow is directed to the location at which heat is dissipated.

The blade-like guide elements are designed similarly to the guide blades of stators which, primarily in multi-stage pumps, are positioned downstream of the impeller rotors. Said guide elements surround the fan impeller in a radial space around the fan impeller. The cooling air flow impinges on a radial leading edge of the blade-like guide elements. Owing to their curvature counter to the direction of rotation of the fan impeller and the rounded fan shroud, the radially oriented cooling air flow is redirected into an axial orientation of the cooling air flow without any flow separation or vortex formation. The cooling air flow that has been redirected in a particularly effective manner with virtually no losses exits the blade-like guide elements by virtue of the fact that, at the axial trailing edge of the blade-like guide elements, said cooling air flow enters the annular channel for cooling the stator housing.

According to the disclosure, the guide elements extend radially from the inner wall of the shroud in the direction of the centrally arranged rotor shaft. Here, the guide elements have, with increasing extent, an increasing radius of curvature counter to the direction of rotation of the fan impeller. In this way, it is preferably possible to achieve a redirection of flow without pulsing conditions, flow separation or vortex generation. This ideally intensifies the cooling performance of the cooling arrangement. At the same time, the generation of noise during operation is considerably reduced in relation to cooling arrangements that are not dependent on a direction of rotation.

The shroud of the cooling arrangement is formed as a single piece with the guide elements. The shroud can thus be produced economically, for example as a plastics injection-molded part. In an alternative variant of the disclosure, a metal-based shroud is also conceivable.

The electronics housing is seated on the stator housing of the electric motor and is spaced apart by the height of the elements for dissipating heat, in particular of the cooling fins. Here, the electronics housing has a shape that forms a channel for dissipating heat between the stator housing and electronics housing. The shroud advantageously has an protuberance which has guide elements of elongated form and which efficiently redirects a cooling air flow into said cooling channel and can thus particularly effectively dissipate the waste heat of the electric motor and of the motor electronics.

According to the disclosure, a space that is formed by the shroud with guide elements radially fully encloses the fan impeller of the cooling arrangement. This design solution is particularly ideal for the targeted redirection of the cooling flow in order to avoid flow separation and vortex formation. Particularly quiet operation of the cooling arrangement is thus possible.

A directed cooling air flow is highly important for efficient cooling with full cooling performance. Ideally, the shroud forms an annular channel between the inner wall surface of the cylindrical part of the shroud and an outer wall surface of a housing of the electric motor, in particular of the stator housing with integrally formed cooling fins. The cooling air flow drawn in and generated by the fan impeller is firstly redirected by the guide elements of the shroud, and by the shape of the shroud itself, from a radial direction into an axial direction. Owing to the inventive design of the blade-like guide elements, the redirection involves no vortex formation, flow separation or disturbing noise emissions. The cylindrical part of the shroud advantageously adjoins the stator housing such that an annular channel is formed, into which the cooling air flow is injected. In this way, the cooling performance of the cooling arrangement is particularly high, in particular even at low rotational speeds of the electric motor.

In one particularly advantageous embodiment of the disclosure, the shroud has a rounded portion that promotes the redirection of the cooling air flow with no vortex formation. This rounded transition is arranged between the axially arranged intake grille and the cylindrical part of the shroud, which radially adjoins the stator housing. The rounded transition likewise influences the shape of the guide elements, which, because they are formed as a single piece with the shroud, seamlessly adjoin the inner wall of the shroud and the rounded shape thereof. In this way, the cooling air flow can be redirected, without flow separation and without disturbing generation of noise, into the axial flow over the stator housing and through the cooling channel between stator housing and electronics housing. Since the cooling air flow should not only be directed uniformly onto the cooling fins of the motor but should likewise cool the electronics housing for the power electronics, an asymmetrical distribution of the cooling air stream is necessary in the region of the electronics housing. Therefore, in this embodiment, the fan shroud has an asymmetrical protuberance which deviates from a circular shape and which allows an increased air flow in this region.

The fan impeller is seated on the rotor shaft of the electric motor outside the stator housing, directly downstream of the end shield on the side averted from the pump. The rotor shaft thus drives the fan impeller at the respective rotational speed of the electric motor. The cooling arrangement is minimally spaced apart from the electric motor so as not to disadvantageously restrict the footprint owing to overly bulky structures.

According to the disclosure, the fan impeller has blades that are curved backward in a direction of rotation. The carrier disk of the fan impeller has a hub projection which is formed to the intake side of the cooling air flow and to which the blades are attached in a manner offset from the center. The blades protrude from the carrier disk in the direction of the intake side and preferably have a profile that is curved counter to the direction of rotation. In particular, all blades may have the same curvature.

In a particularly expedient embodiment of the disclosure, the fan impeller is formed as a single piece with the blades. It has proven to be advantageous here for the impeller and/or the blades to be manufactured from a metallic material or from injection-molded plastics.

Ideally, the carrier disk of the fan impeller is configured in the shape of a trumpet bell, the carrier disk tapering in the intake direction, in particular in the direction of the intake grille. A section through this trumpet bell yields a series of one or more circular arcs and straight lines. This curve profile can be replicated by the mathematical shape of a hyperbola. This special construction of the carrier disk redirects the cooling air flow particularly smoothly and thus avoids flow separation, which would in turn give rise to vortex formation and noise emissions.

The flow-optimized generation of the cooling air flow using the fan impeller is achieved in particular by means of the blade arrangement. Here, the blades of the fan impeller are curved radially counter to the direction of rotation. They are attached to the trumpet bell shape outside the central point, and thus in an eccentric arrangement on the carrier disk. The point of attachment originates on an imaginary ring on the trumpet bell of the carrier disk, which ring corresponds approximately to one third of the diameter of the carrier disk.

The course of the blade centerline between the blade leading edge and blade trailing edge is referred to as the profile mean line. It is often described by a circular arc or else by a parabolic arch, an S bend or other analytical curves.

The blades according to the disclosure of the fan impeller have a rounded portion at their point of attachment on the carrier disk. The profile mean line of the blades extends from a rounded portion and ends exactly at the outer edge of the carrier disk. The advantageous construction is part of the flow-optimized embodiment of the fan impeller, which makes it possible for a cooling air flow to be generated by the cooling arrangement without any flow separation or vortex formation. The waste heat of the electric motor and of the motor electronics can hereby be dissipated particularly effectively, without a disturbing generation of noise.

In one particularly advantageous variant of the disclosure, the blades of the fan impeller are arranged obliquely in a circumferential direction. The cooling air flow can thus be generated particularly quietly. The angle of the obliquity with respect to the rotor shaft of the electric motor is preferably more than 5°, in particular more than 10°, preferably more than 15°, and/or preferably less than 45°, in particular less than 40°, preferably less than 35°. Since the fan impeller should preferably be manufactured as an easily demoldable injection-molded part, the blade surface is designed as a screw surface that arises as a result of the profile mean line of the blade being skewed with a suitable gradient about the axis of rotation of the fan impeller.

The construction of the cooling arrangement, in particular of the shroud and of the fan impeller, is distinguished by a design that allows particularly easy maintenance. Here, the parts can be particularly easily disassembled, thus allowing maintenance to be performed more quickly.

Further features and advantages of the disclosure will emerge from the description of exemplary embodiments on the basis of the drawings, and from the drawings themselves, in which:

DETAILED DESCRIPTION

Figure 1:
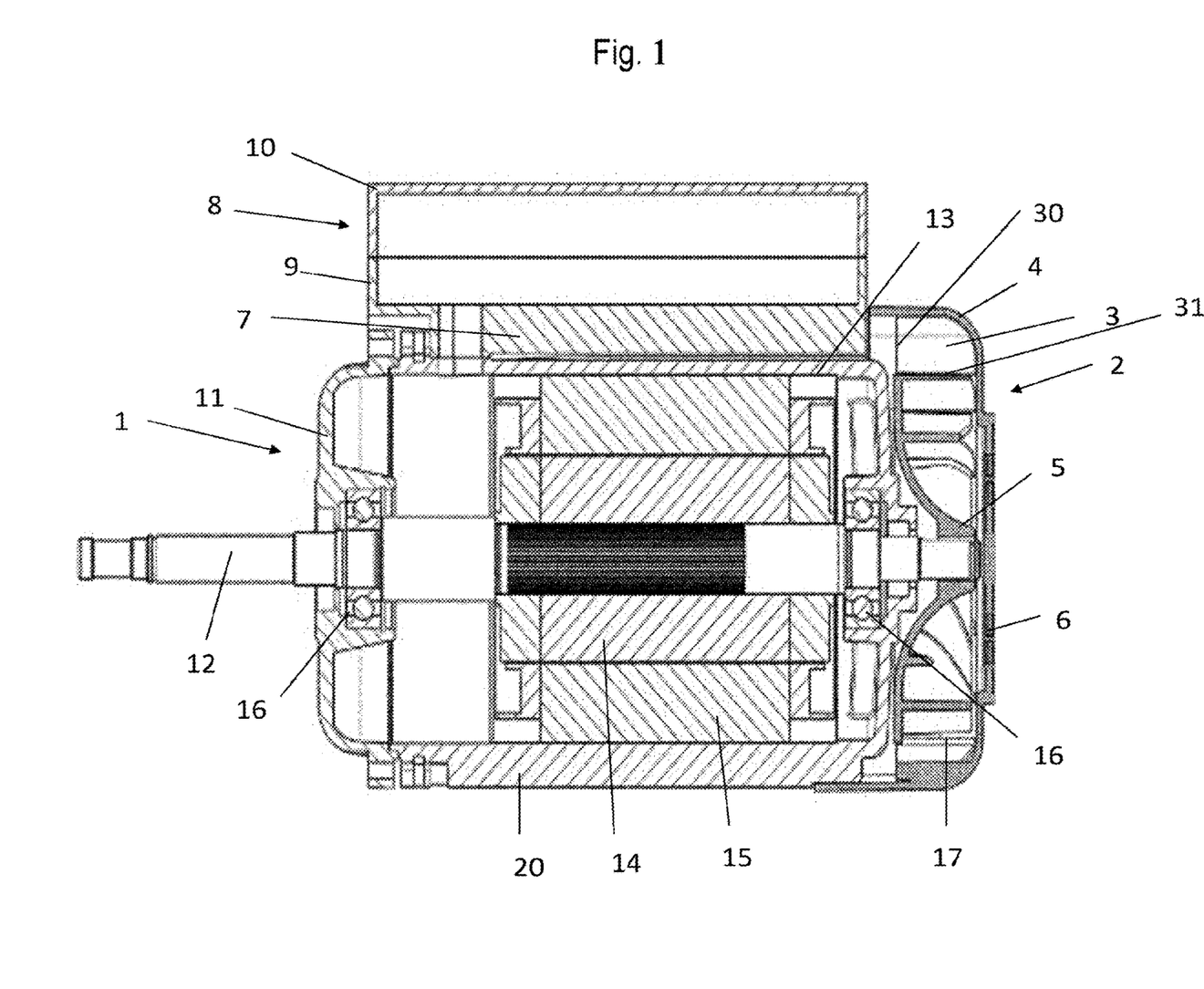
FIG. 1 shows a section through an electric motor, which has a cooling arrangement, for driving a centrifugal pump.

FIG. 1 illustrates a section through an electric motor 1 that is provided for driving a centrifugal pump. The rotor shaft 12 is supported and rotatably mounted by a pump-side end shield 11, and an end shield formed as a single piece with the stator housing 13, by way of the integrated rolling bearings 16. The rotor shaft 12 has a rotor 14. In accordance with the electric motor principle, the revolving magnetic field of the stator 15 drives the rotor 14.

The electronics housing 8 is seated on the stator housing 13 and is formed from the electronics housing lower part 9 and the electronics housing cover 10. The motor electronics, composed of frequency converter, power controller and/or rotational speed controller, is arranged in the electronics housing 8. Heat dissipation elements 7 are positioned in the electronics housing lower part 9. In this exemplary embodiment, the heat dissipation elements 7 are configured as cooling fins. The heat of the electric motor 1 is transferred via the stator housing 13, and at the same time the heat of the motor electronics is transferred via the electronics housing lower part 9, to the heat dissipation elements 7.

The cooling arrangement 2 is attached to that side of the electric motor 1 which faces away from the pump. Said cooling arrangement is composed of the fan impeller 5 and of the shroud 4 with integrated openings 6. Here, the shroud 4 encloses a radial space 17 around the fan impeller 5, with guide elements 3 being arranged in said space 17. The blade-like guide elements 3 have a radial leading edge 31 and an axial trailing edge 30. The fan impeller 5 draws an air flow in axially through the openings 6 of the shroud 4 and redirects said air flow radially into the space 17. Owing to their curvature being radially opposed to that of the fan impeller 5, the guide elements 3, which in this exemplary embodiment are of blade-like configuration and are formed as a single piece with the shroud 4, redirect the air flow axially such that said air flow passes over the heat dissipation elements 7 and 20, which are arranged radially over the entire stator housing 13, in order to efficiently cool the motor and the motor electronics.

Figure 2:
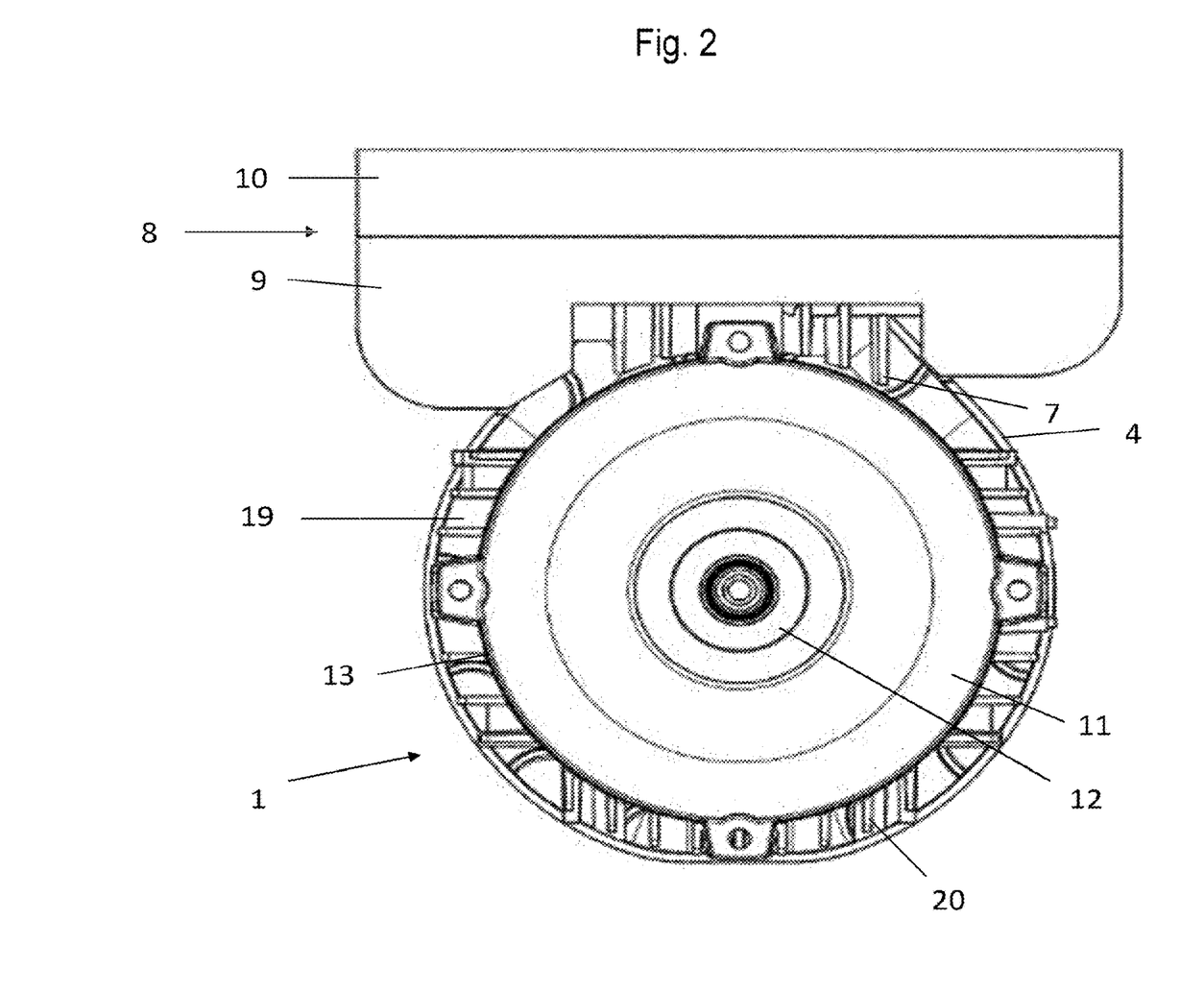
FIG. 2 shows a front view of the electric motor.

FIG. 2 shows a side view of the electric motor 1 from the perspective from which the connection to the centrifugal pump takes place. The electronics housing 8 is seated on the stator housing 13. Here, the electronics housing comprises the electronics housing lower part 9 and the electronics housing cover 10. Heat dissipation elements 7 are attached to the electronics housing lower part 9, and the heat dissipation elements 20 are attached the stator housing 13. In this exemplary embodiment, both heat dissipation elements 7 and 20 are configured as cooling fins. The shroud 4 projects over the stator housing 13 with the elements for heat dissipation 7 and 20 such that an annular channel 19 is formed, which just encloses the heat dissipation elements 7 and 20. The cooling air flow can thus advantageously be introduced in an ideal manner into, and flow for cooling purposes through, the channels that are formed by the heat dissipation elements 7 and 20 together with the stator housing 13.

Figure 3:
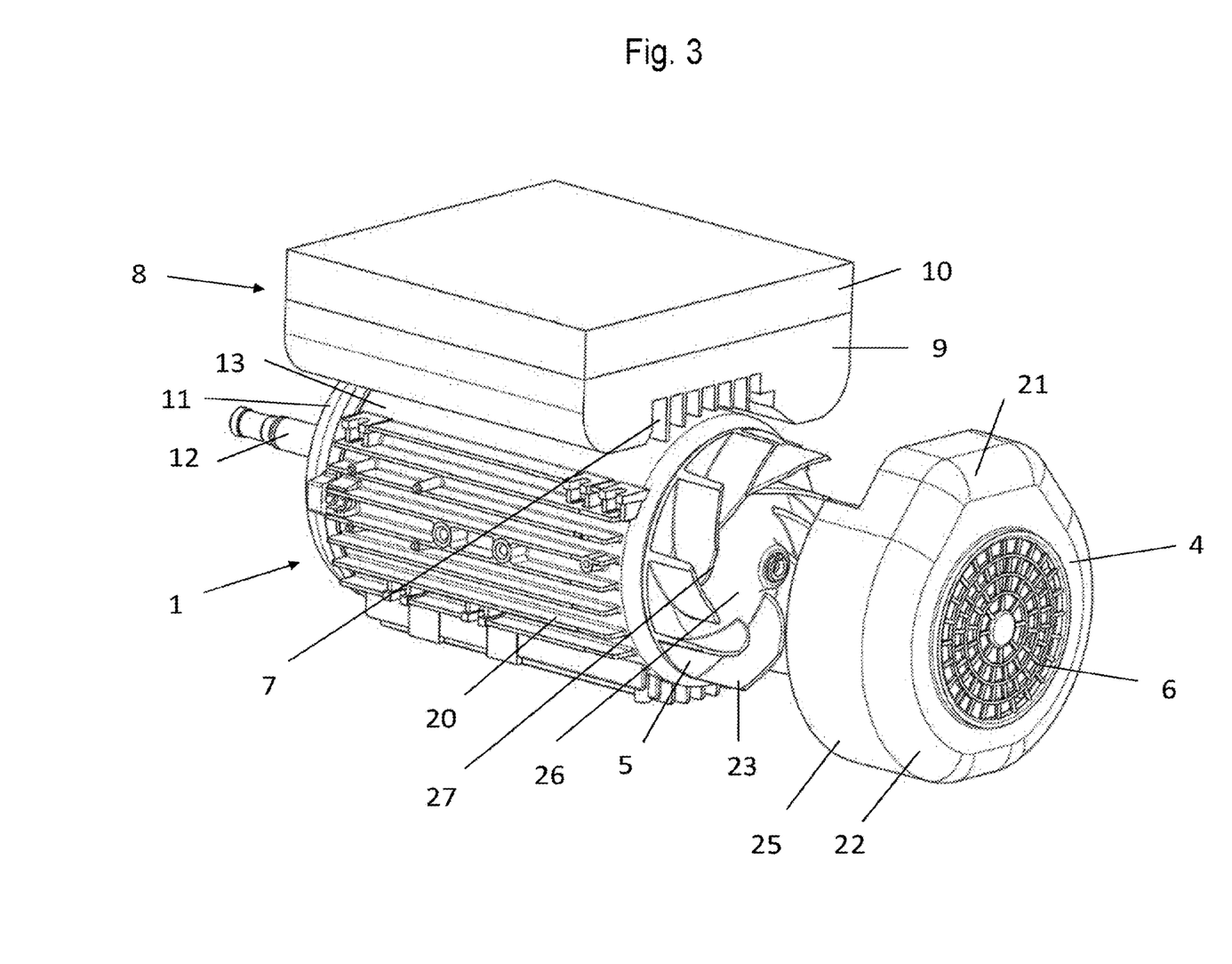
FIG. 3 shows a perspective view of the electric motor having the cooling arrangement, with the shroud having been removed.

FIG. 3 shows an electric motor 1 having the cooling arrangement 2, with the shroud 4 illustrated as having been removed. The shroud 4 has openings of the intake grille 6, which in this exemplary embodiment are configured in the form of a grille within the shroud 4. The shroud 4 furthermore has an asymmetrical protuberance 21 which is intended to conduct an adequately large cooling air flow into the channel that is formed by the heat dissipation elements 7, the stator housing 13 and the electronics housing lower part 9. The heat generated by the electric motor 1 and the heat generated by the motor electronics arranged in the electronics housing 8 can thus be advantageously dissipated. The shroud 4 has a rounded transition 22 from the openings 6 to the cylindrical part 25. The radial cooling air flow is thus very advantageously redirected axially so as to flow through the channels that are formed from the heat dissipation elements 20 and the stator housing 30. This cooling air flow is generated by the fan impeller 5 which has blades 23, which blades are curved backward in a direction of rotation and are arranged on the bell-shaped carrier disk 26. At their point of attachment, the blades 23 have a rounded portion 27 on their profile mean line.

Figure 4:
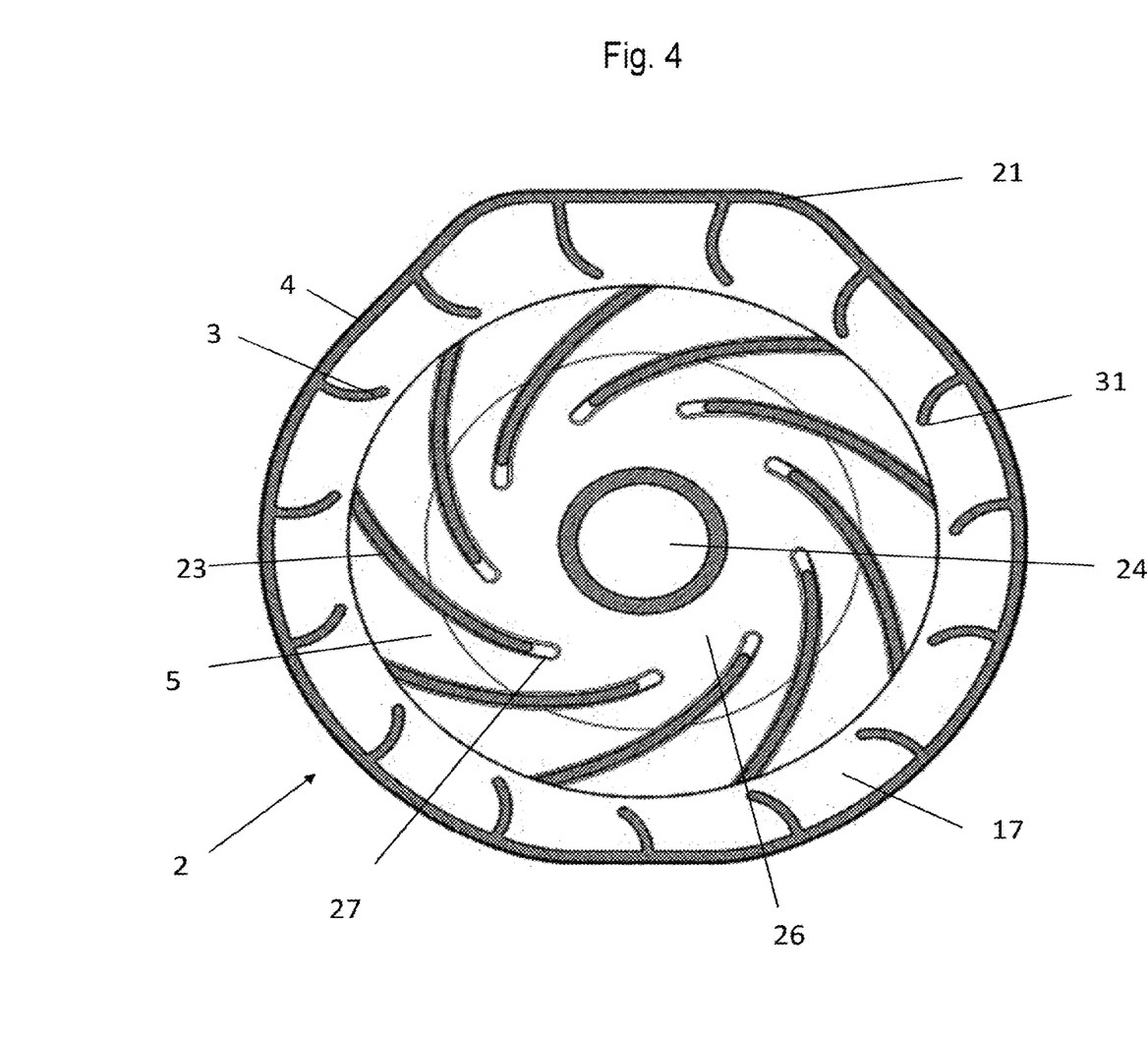
FIG. 4 shows a section through the cooling arrangement.

FIG. 4 shows a section through the cooling arrangement 2. In the interior of the cooling arrangement 2, the fan impeller 5 with the blades 23 that are curved backward in a direction of rotation is positioned, by way of the opening 24, on the rotor shaft 12 (not illustrated). The fan impeller 5 has a trumpet-bell-shaped carrier disk 26 that tapers toward the opening 24 in the direction of the plan view. The blades 23 originate from the carrier disk 26 with a rounded portion 27. The point of attachment of the blades 23 lies on an imaginary line that corresponds approximately to one third of the diameter of the fan impeller 5. The point of attachment of the blades 23 thus lies outside the center that is marked by the opening 24. The shroud 4 encloses the space 17 that radially fully surrounds the fan impeller 5. The guide elements 3 are arranged in this space 17 and are formed as a single piece with the shroud 4. The guide elements 3 have a radial curvature that is opposed to the fan impeller curvature, and have a radial leading edge 31. The shroud 4 furthermore has an asymmetrical protuberance 21 in which the guide elements 3 are also adapted, in lengthened form, to the asymmetrical shape.

Figure 5:
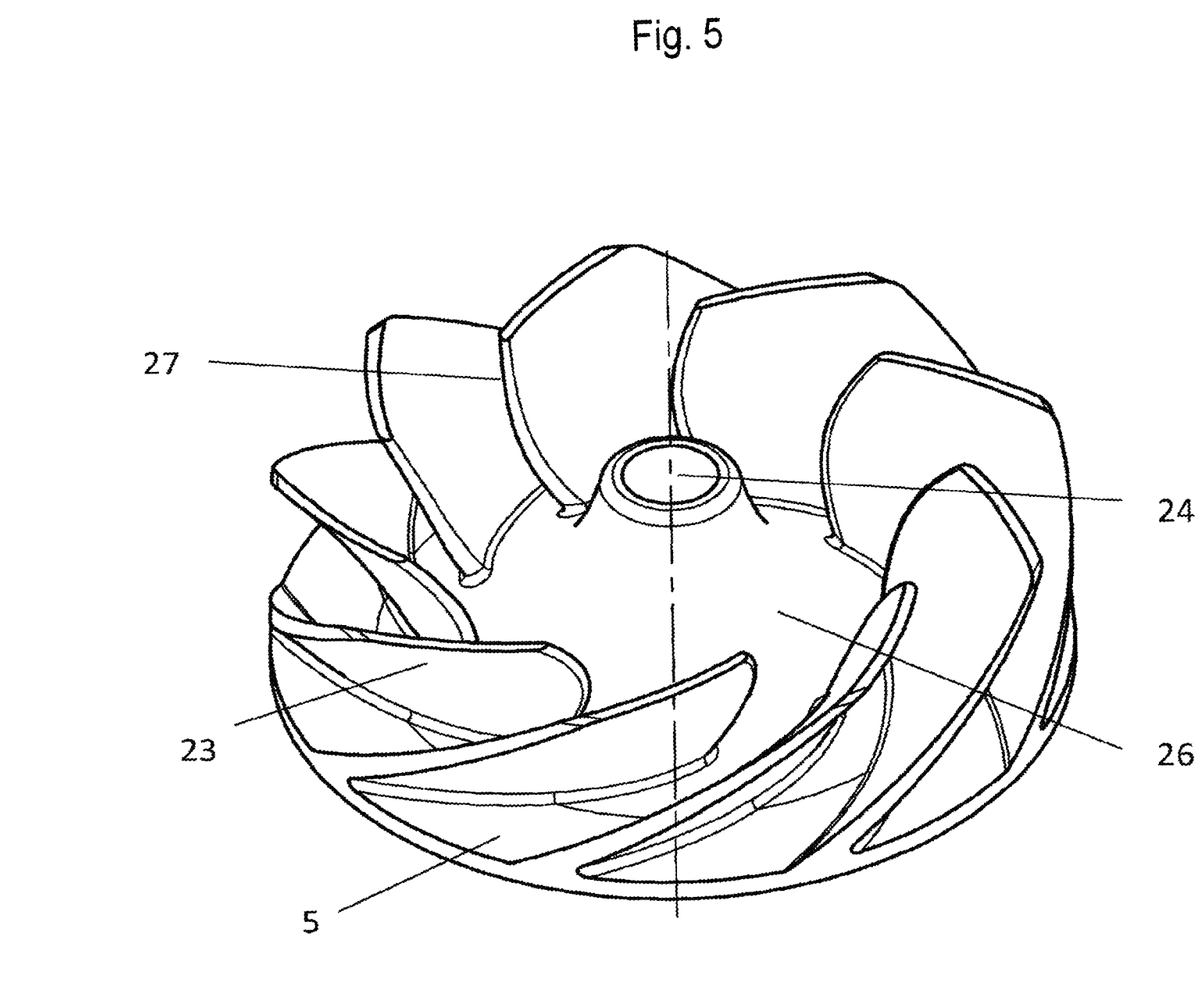
FIG. 5 shows a perspective view of a fan impeller according to the disclosure.

FIG. 5 shows a perspective view of the fan impeller 5, which has a trumpet-bell-shaped carrier disk 26 that tapers toward the opening 24. The blades 23 are curved backward in a direction of rotation and are additionally oriented obliquely in a circumferential direction. The angle of the obliquity with respect to the rotor shaft 12 (not illustrated), which projects through the opening 24 for the positioning of the fan impeller 5, is more than 5°, preferably more than 10°, in particular more than 15°, and/or less than 45°, preferably less than 40°, in particular less than 35°. At their point of attachment on the carrier disk 26, the blades 23 have a rounded portion 27. The cooling air flow can thus advantageously be generated particularly quietly.

The foregoing disclosure has been set forth merely to illustrate the disclosure and is not intended to be limiting. Since modifications of the disclosed embodiments incorporating the spirit and substance of the disclosure may occur to persons skilled in the art, the disclosure should be construed to include everything within the scope of the appended claims and equivalents thereof.

The invention claimed is:

1. An electric motor configured to drive a centrifugal pump, comprising:
   a cooling arrangement which comprises a fan impeller and a shroud, wherein
   the shroud encloses a space around the fan impeller, guide elements are arranged in the space,
   the guide elements are formed integrally as a single piece with the shroud,
   the guide elements extend radially from different curved surfaces of the shroud in the direction of a rotor shaft and,
   the guide elements have an increasing radius of curvature, which increases counter to a direction of rotation of the fan impeller.

2. The electric motor as claimed in claim 1, wherein the guide elements have a radial leading edge and an axial trailing edge.

3. The electric motor as claimed in claim 1, wherein the shroud has a protuberance configured to form a channel to heat dissipation elements of the electronics housing.

4. The electric motor as claimed in claim 3, wherein the space fully encloses the fan impeller radially.

5. The electric motor as claimed in claim 4, wherein an annular channel is formed between an inner wall surface of the shroud and an outer wall surface of a housing of the electric motor.

6. The electric motor as claimed in claim 5, wherein the shroud has a rounded transition from an intake grille to the cylindrical part.

7. The electric motor as claimed in claim 6, wherein the fan impeller has blades that are curved backward in a direction of rotation.

8. The electric motor as claimed in claim 7, wherein all of the blades of the fan impeller have the same curvature.

9. The electric motor as claimed in claim 8, wherein a carrier disk of the fan impeller is configured in the shape of a trumpet bell, the carrier disk tapering in the direction of the opening.

10. The electric motor as claimed in claim 9, wherein the blades of the fan impeller are attached, outside a central point of the carrier disk, to a ring of the bell shape.

11. The electric motor as claimed in claim 10, wherein all of the blades have a rounded portion at their point of attachment on the carrier disk.

12. The electric motor as claimed in claim 11, wherein the blades of the fan impeller are arranged so as to be oblique in a circumferential direction, the angle of the obliquity with respect to the rotor shaft being between more than 5° and less than 45°.

13. The electric motor as claimed in claim 1, wherein the guide elements are distributed around an entire circumference of the shroud.

* * * * *